United States Patent [19]

Kouklik

[11] 3,940,953
[45] Mar. 2, 1976

[54] SYSTEM FOR CENTRALLY CONTROLLING A PLURALITY OF KNITTING MACHINES

[75] Inventor: Ivo Kouklik, Trebic, Czechoslovakia

[73] Assignee: Elitex, Liberec, Czechoslovakia

[22] Filed: July 8, 1974

[21] Appl. No.: 486,321

[30] Foreign Application Priority Data

July 12, 1973 Czechoslovakia .................. 5010-73

[52] U.S. Cl. ................ 66/154 A; 66/50 B; 66/75 A
[51] Int. Cl.² .......................................... D04B 15/66
[58] Field of Search ...... 340/173 SP, 174 SP; 66/25, 66/50 R, 50 B, 75, 154 A

[56] References Cited
UNITED STATES PATENTS 3,825,900  7/1974  Anderson .......................... 66/25 X
3,844,139  10/1974  De Cerjat et al. .................. 66/50 R

*Primary Examiner*—Ronald Feldbaum

[57] ABSTRACT

A plurality of knitting machines are controlled from a central control device and a common patterning memory. Each knitting machine is provided with its own needle and course counters in which the needle position is determined. The single control device provides separate clock signals to the counters of each machine so that they may be individually switched to the patterning memory. Simultaneously, the control device provides means by which the output from the memory is switched to the electromagnet controlling needle operation in synchronism with the needle counter.

9 Claims, 7 Drawing Figures

SYSTEM FOR CENTRALLY CONTROLLING A PLURALITY OF KNITTING MACHINES

RELATED APPLICATION

The present invention is related to applicant's copending application Ser. No. 486,322 filed on even date hereof.

BACKGROUND OF THE INVENTION

The present invention relates to a system including a method and apparatus for centrally controlling a group of knitting machines, and particularly to a method and apparatus for providing a plurality of small diameter circular knitting machines with a system for operating all of the machines mutually independently of each other.

In the known circular knitting machines it is necessary, upon changing the kind of knitwork, to readjust the patterning means of each machine separately, either mechanically, or in newer types of machines, by changing the electronic patterning program. Even when certain machine types are arranged for group operation they have a common drive and a governing device for a plurality of knitting units and they operate synchronously. This is being obtained by a common mechanical drive.

The disadvantage of this arrangement consists in that the failure in one knitting machine causes stoppage of all others. Even in those arrangements, when only the faulty machine is adapted to stop, it cannot readily be placed back in action after repair, so long as the other machines are not at the start of a new knitwork. Thereby, down time losses are caused and arrangement of such machines are uneconomical in their operation.

This disadvantage applies also for the group of electronically controlled knitting machines. The machines must operate substantially synchronously, even when a fault occurs in one machine, due to the very difficult synchronous operation. The influence of this fault is removed by providing the buffer memories for each machine, which permit operation of the remaining machines without undue influence. An independent operation of the machines, however, is not possible due to the relatively small capacity of the memories.

It is an object of the present invention to provide a method and apparatus for controlling the operation of a plurality of knitting machines to avoid the problems and disadvantages of the prior art.

It is a further object of the present invention to provide a method and apparatus for individually and independently controlling a plurality of knitting machines from a central control device and a common patterning memory.

It is an object of the present invention which is more economical, simpler, easier to use than heretofore known.

These and other objects will be seen in the following disclosure of the present invention.

SUMMARY OF THE INVENTION

According to the present invention each of a plurality of electronically patterned knitting machines of conventional form are provided with their own means for determining the position of the needles in their courses. Such means include needle and course counters, decoders and accumulators capable of reading the patterning memory. A single common patterning memory and a single central control device is provided. Through appropriate signals from the control device clock signals are provided sequentially so that the needle and course counters of each knitting unit will read the pattern, and further signals provided so that the output of the patterning memory may be synchronously fed to the appurtenant electromagnet actuator for the proper needle selection of the knitting machine.

The system of the present invention provides for the output of the common patterning memory to be switched by the control device to the appurtenant means (an accumulator) for control of the electromagnet at such a speed that the output valve for such control is triggered by a signal from the needle counters, in synchronism with the passing needles.

Full details of the present invention are given in the following specification and will be seen in the accompanying drawings.

DESCRIPTION OF THE INVENTION

Figure 1:
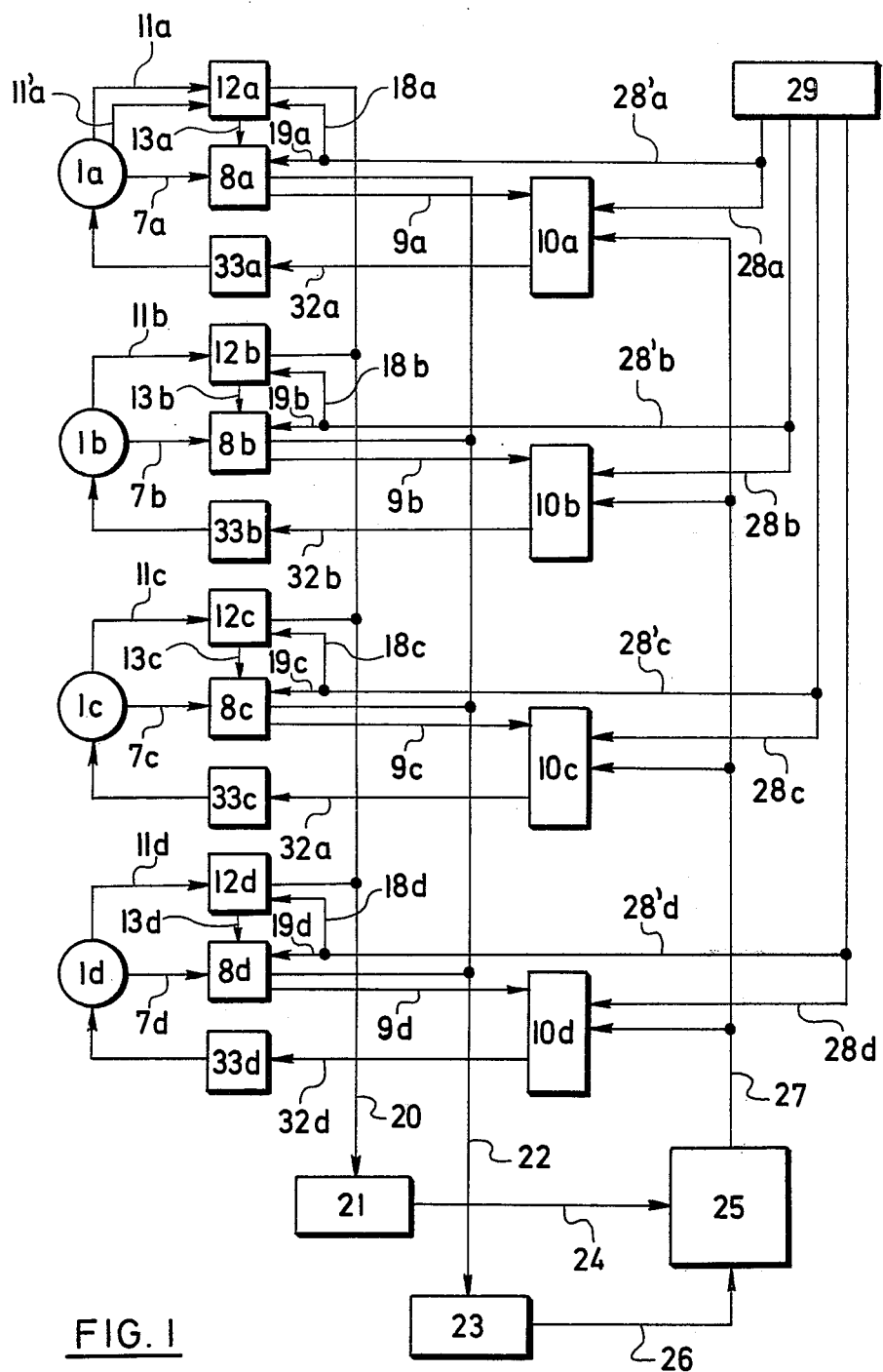
FIG. 1 is a circuit diagram of the wiring of the control system for operating a group of knitting machines, according to the present invention.

A plurality of circular knitting machines 1a to 1d are illustrated in FIG. 1 arranged for independent control by a common control system. The knitting units are of the type which are conventional and well known in structure, and for illustration may be described here as having only one feed. Each knitting machine comprises at least one cylinder in whose longitudinal groove are mounted needleselectors, jacks and the like which are actuated, so as to select given needles for operation, by an electromagnet. The electromagnet being operable in response to a signal given from a prerecorded patterning program. The present invention may, for example, be applied to a circular knitting machine of conventional construction having 160 needles in its cylinder and one provided with memory system of a structure described in Czechosloval Pat. No. 135,196 or in the following:

Electronics in Knitting, Charles Reichman, ed. Am. Soc. of Knitting Technologists and The National Knitted Outerwear Assoc. 1972,
Ser. No. 342,941, filed Mar. 20, 1973
Ser. No. 246,623, filed Apr. 24, 1972
Ser. No. 246,792, filed Apr. 24, 1972
Ser. No. 246,791, filed Apr. 24, 1972
Ser. No. 246,699, filed Apr. 24, 1972.

Each knitting machine is provided with a disc (not illustrated) mounted to rotate jointly in conjunction with the the rotation of the needle cylinder. The disc is provided with a plurality of holes uniformly spaced about its circumference corresponding to the number of needles mounted in the cylinder. In addition, a single hole is provided radially offset inwardly from the plural circle of holes. Mounted in conjunction with one side of the disc is a light source and in conjunction with the other side two photoelectric cells, photo-transistor or similar pick-up. The first photo-electric cell of each machine (indicated in FIG. 3 by the numeral $2'a$) is arranged to pick up the light pulses passing through the plurality of circumferential holes corresponding to the needles. The second photo cell of each machine (indicated in FIG. 2 by the numeral $2a$) is arranged to sense the light pulse passing through the one additional hole, and thus indicates a full revolution of the disc and consequently the passage of the needle cylinder through a single course. This arrangement is more fully described in Czechoslovak Pat. No. 135,196.

Figure 2:
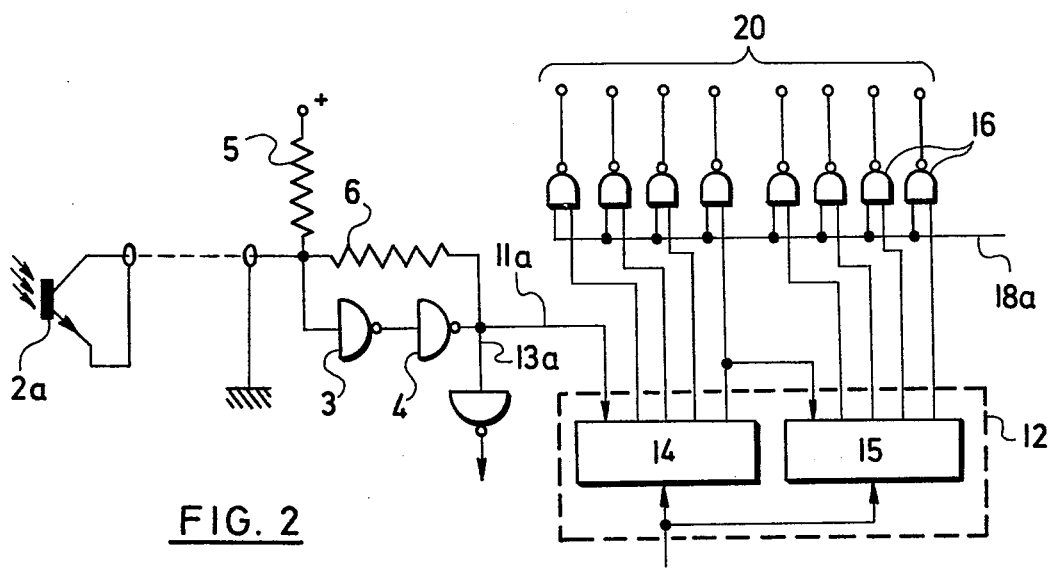
FIG. 2 is a diagram of a needle counter with keyed outputs used in the system of FIG. 1, FIG. 3, is a diagram of a course counter with keyed outputs used in the system of FIG. 1.
Figure 3:
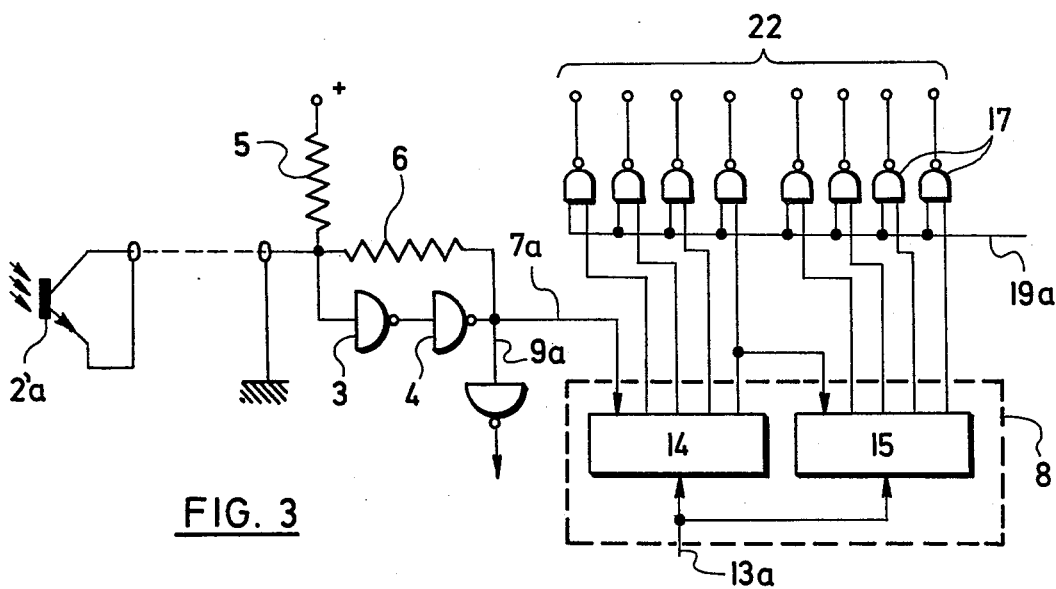

As seen in FIGS. 2 and 3, the photo-cells $2a$ and $2'a$ from each machine are connected to a bistable trigger circuit comprising gates 3 and 4 (as for example, one half of the circuit type SN 7 400) and resistors 5 and 6 in which the signal from the photo-cell 1 is shaped to a square or rectangular wave pulse. The resistor 5 is connected to the positive pole of a suitable source of voltage. The bistable trigger circuits are connected to digital to binary counters respectively, one counter 8 for needle passage, one counter 12 for course passage by which the pulse signals from the photocell are counted to indicate the passage of the needles.

For convenience, in the following, the pulses from photo-cell $2a$ are called course pulses and the pulses from photo-cell $2'a$ are called the needle pulses. The photo-cell $2'a$ from each of the individual machine is connected by lines $7a$ to $7d$ (FIG. 1) to needle counters $8a$ to $8d$, from which it is connected by lines $9a$ to $9d$ to information accumulators $10a$ to $10d$. The photo-cells $2a$ are each connected by lines $11a$ to $11d$ to course counters $12a$ to $12d$ and thence are interconnected by lines $13a$ to $13d$ to needle counters $8a$ to $8d$ respectively.

The course counters $12a$ to $12d$ and the needle counters $8a$ to $8d$ are identical binary counters in integrated form. The course counters $12a$ to $12d$ consist of two binary counting circuits 14, 15 (FIG. 2) of the SN 7493 type, which are able to record $16 \times 16$ decimal or $4 \times 4$ binary digits. Microswitches (not illustrated) are connected to the circuits 14 and 15 of each of course pulse counters 12 by lines $11'a$ to $11'd$ (FIG. 1, represented only for the first machine). The microswitches are closed upon starting the knitting operation for the purpose of zeroing each of the course counter $12a$ to $12d$ to a given initiating or starting position.

The needle counters are two similar circuits 14 and 15 of the SN 7493 type, and may be used with needle cylinders having less than 256 needles, by selectively grounding certain of their outputs to the common zeroing input.

Each of the circuits 14 and 15 of both the course and needle counters have plural (eight operand) outputs which are connected respectively to one of the inputs of the several nand gates. Each set of gates 16 and 17 are part of an opened collector of the SN 7403 type. The second inputs of gates 16 are connected by a common bus line $18a$ to $18d$ while the second inputs of gates 17 by a bus line $19a$ to $19d$. The outputs of all gates 16 are connected by line 20, in common to a course pulse decoder 21, as seen in FIG. 1 and the outputs of all gates 17 are connected to needle pulse decoder 23 of needle pulses, this being shown as line 22, in FIG. 1.

The decoders 21 and 23 are formed, for example, of permanent memories of the PROM type, which are made of semiconductors in integrated form, and of which the operation is specified Ser. No. 486,322. These memories can be programmed as disclosed in the aforementioned application to contain a fixed or variable patterning program for the knitwork. The decoder 21 is connected by line 24 to the course line of patterning memory 25 and decoder 23 by line 26 to the wale line of patterning memory 25. A more detailed specification of the patterning memory is comprised in the Czechoslovak Pat. No. 135,196. A detailed explanation of a type of arrangement of trigger circuit, counter, decoder and memory for an individual machine is also set forth in the copending related application of even date.

An output signal is fed from the patterning memory 25 through line 27 to each of a plurality of information accumulators $10a$ to $10d$ associated with each pair of counters 8 and 12 to thereby informing the separate machines of the pattern program read by decoders 21 and 23. An input of the accumulators $10a$ to $10d$ are connected by lines $28a$ to $28d$ to a common control unit 29. Lines $28a$ to $28d$ from the control device 29 are further divided into lines $28'a$ to $28'd$ leading to the common bus lines $19a$ to $19d$ of gates 17 of the counters $8a$ to $18d$, and to the common bus lines $18a$ to $18d$ of the gates 16 of $12a$ to $12d$.

Figure 4:
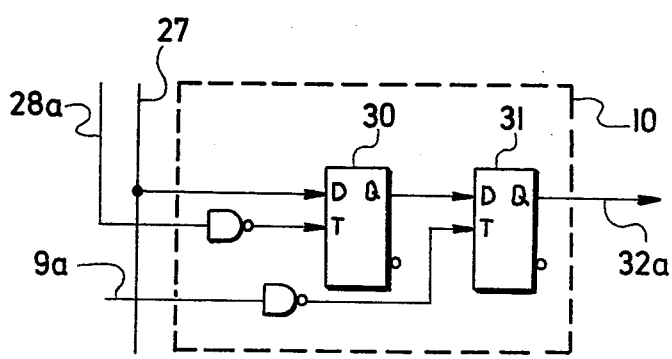
FIG. 4 is a diagram of an information accumulator for one feed of a circular knitting machine used in the system of FIG. 1.

As seen in FIG. 4, the accumulators $10a$ to $10d$ each consist of two bistable trigger circuits 30, 31 of the "D" type, where D denotes the input, Q the output and T the input for a clock pulse supplied via an inverter. The input D of each of the second circuits 31 is connected to the output Q of the associated circuit 30. A clock pulse is supplied synchronously to the input T of each of the circuits 31, over lines $9a$ to $9d$, via an inverter from each of the associated needle pulse counters $8a$ to $8d$. The output Q from each of circuits 31 are connected by lines $32a$ to $32d$ to power amplifiers $33a$ to $33d$, which control the operation of the conventional electromagnets, actuating the needle selectors.

Figure 5:
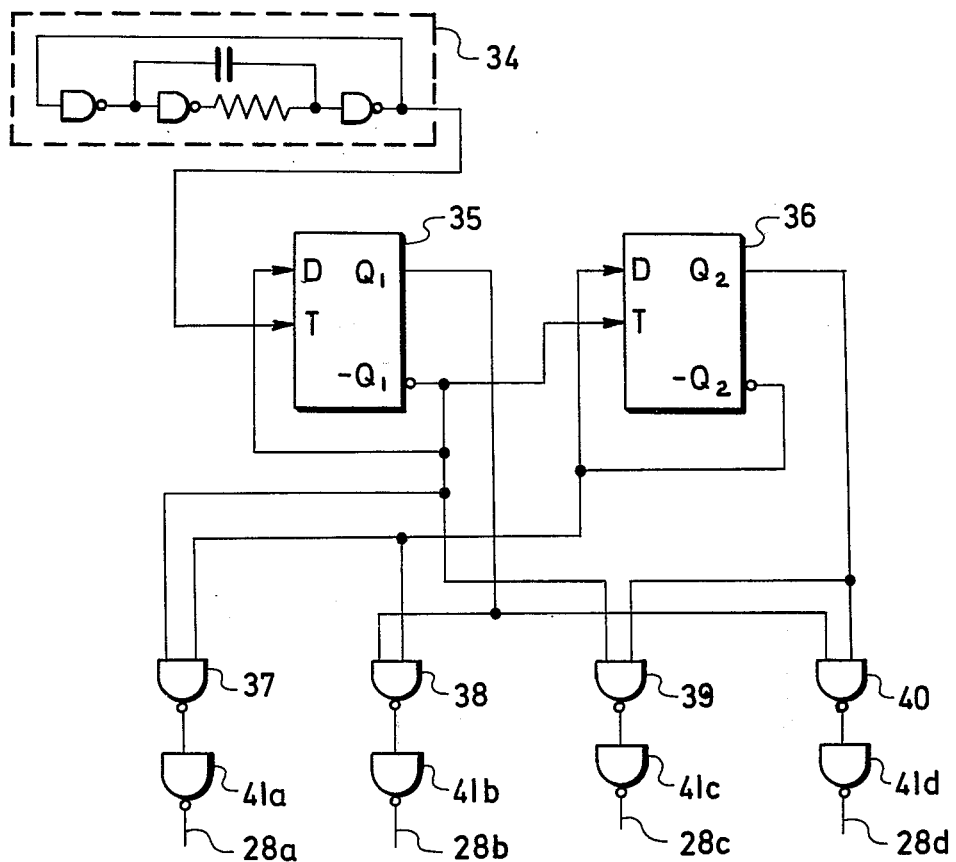
FIG. 5 is a diagram of a control unit of knitting machines used in the system of FIG. 1.
Figure 6:
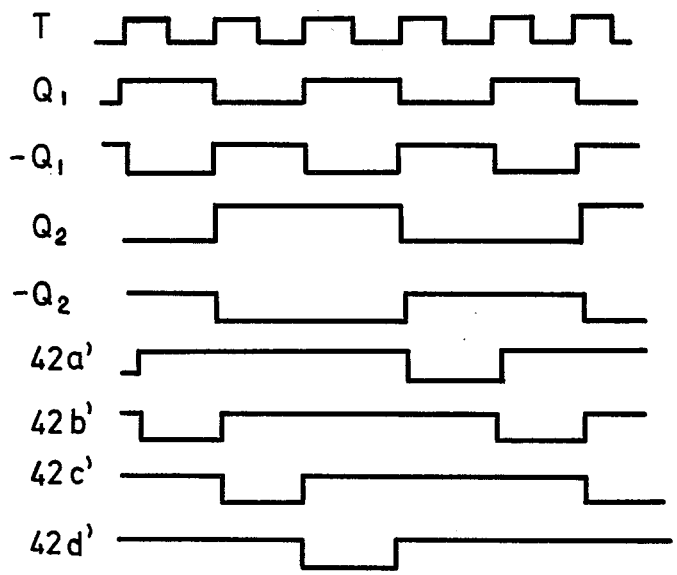
FIG. 6 is the wave form diagram and time course of the signals in the control unit circuit of FIG. 5.

The control unit 28 seen in FIG. 5 consists of a pulse generator 34, comprising a capacitor, a resistor and three gates, in which clock pulse T is generated (FIG. 6). Bistable trigger circuits 35, 36 are connected to the generator 34 being provided again with D and T inputs but with $Q_1$, $-Q_1$, $Q_2$, $-Q_2$ outputs, which are connected to nand gates 37, 38, 39, 40 each having two inputs. The gates are given a zero signal, when signal 1 is on both inputs thereof. Following the separate gates, inverters $41a$ to $41d$ are arranged to which the lines $28a$ to $28d$ are connected.

The device operates as follows:

All machines, i.e. their respective knitting cylinders ($1a$ to $1d$) are caused to rotate in the normal manner. The disc also rotates synchronously with the cylinder. By the passage of the openings in the disc, pulses are generated in the photo-electric pickups $2a$ and $2'a$, which are shaped in the shaping circuits to rectangular (square) pulses. The course pulses are fed by lines $11a$ to $11d$ to course counters $12a$ to $12d$; and by lines $13a$ to $13d$ to needle counters $8a$ to $8d$, which are always adjusted to the initial position upon the sensing of a course pulse. The needle pulses are transmitted through lines 7a to 7d into the needle counters 8a to 8d and thence through lines 9a to 9d into information accumulators 10a to 10d.

Figure 7:
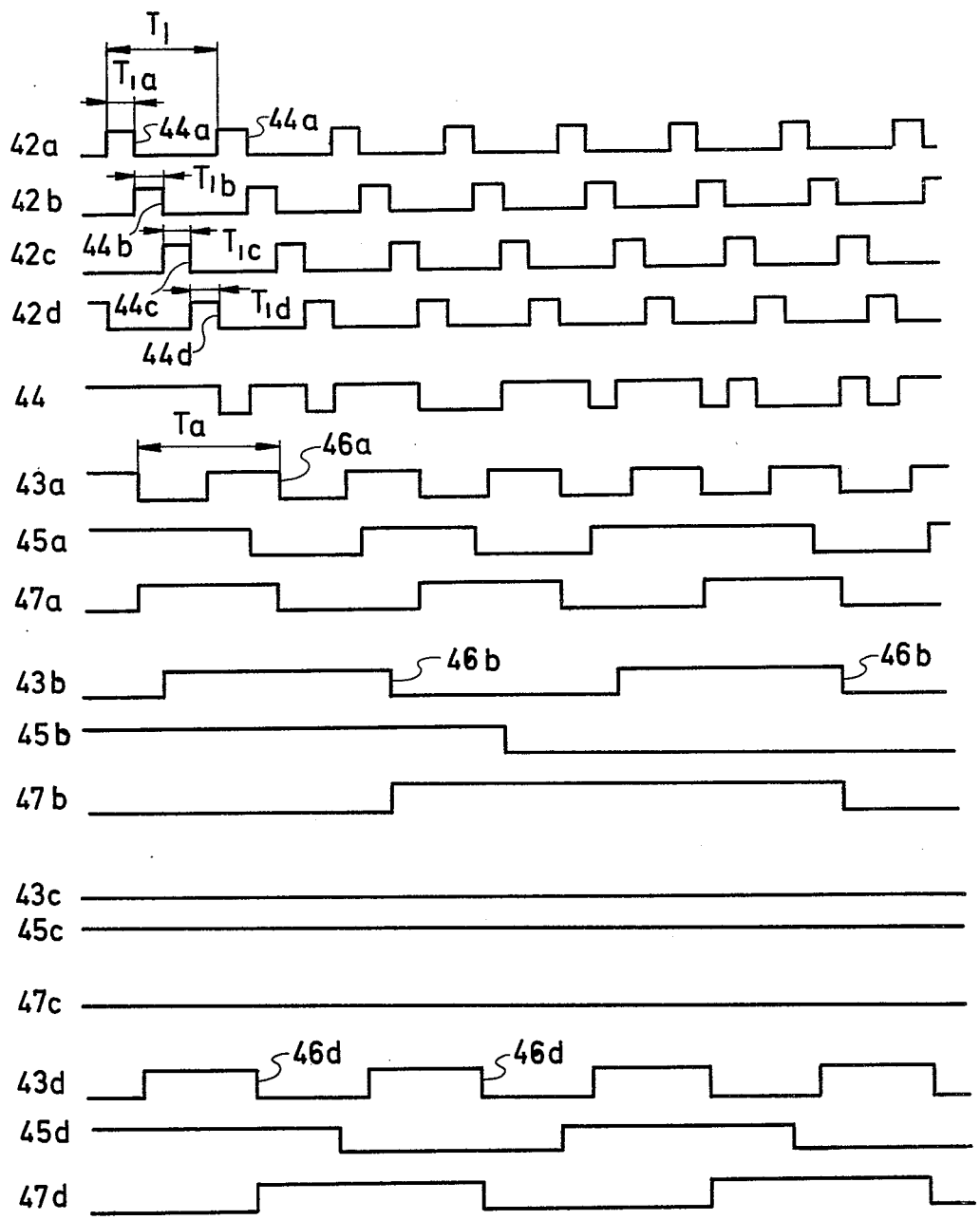
FIG. 7 is the wave form diagram of the signals in the circuits for controlling a group of knitting machines used in the system of FIG. 1.

Simultaneously, clock pulse T is generated in the pulse generator 34 of the common control unit 29 which are fed to the clock input of the bistable trigger circuit 35. Output pulses as shown in FIG. 6 are thus generated at outputs $Q_1$ and $-Q_1$. The output pulse $-Q_1$ is fed as an input clock pulse to the input T of the bistable trigger circuit 36. At the outputs $Q_2$ and $-Q_2$ pulses which are shown again in FIG. 6 are generated. These pulses arrive at gate 37 from outputs $-Q_1$ and $-Q_2$, and when the value of both pulses is the same (1), then the outputs of gate 37 generates a pulse of 0 value for such a time interval, equal or congruent to the value of the outputs $-Q_1$ and $-Q_2$. Thus, an output signal or pulse is generated as seen in FIG. 6 marked 42a. In the same manner output signals are generated on gates 38, 39, 40 marked 42b', 42c', 42d'. The inverters 41a to 41d change the course of pulses to the shape as shown in FIG. 7 and being denoted 42a to 42d, and cause them to pass through lines 28a to 28d.

For the correct operation, or control, individually, of a group of machines, it is necessary that the time interval for which the unit of the fastest machine is rotated for one needle angle, (in FIG. 7, this is indicated time $T_a$ for the cylinder unit 1a marked on the curve of the signal 43a passing through line 9a), should be longer than time $T_1$, that is the total signal arriving at all the machines from control unit 29. The clock signal $T_1$ is composed of time sections $T_{1a}$ to $T_{1d}$ seen marked on the curves of signals 42a to 42d in FIG. 7. The time $T_a$ is determined by the number of needles of the machine which is to achieve highest speed of operation.

The signals 42a to 42d pass through lines 28a to 28d as individual clock pulses to the inputs T of the bistable trigger circuits 30 of the separate accumulators 10a to 10d in time sections 44a to 44d and simultaneously through lines 18a to 18d and 19a to 19d into counters 8a to 8d and 12a to 12d. This causes the gate 17 of counter 8a to open an associated gate 17 and provide, via line 22, an output signal from circuits 14 and 15 into decoder 23, recording the information that the needle of cylinder unit 1a is at the selection point. In the same manner, the appurtenant gate 16 of counter 12a is opened and the information about the number of knitted courses made by unit 1a is fed by line 20 into decoder 21. Further, the same procedure is performed successively at the corresponding moments responsive to the clock signal in counters 8b to 8d and 12b to 12d in each of the other machines. Simultaneously from each of the decoders 21 and 23 there is emitted pulses into the patterning memory 25. A signal 44 (FIG. 7) is generated in known manner, at the output line 27 (FIG. 1) according to the predetermined values of the record in memory 25.

The signal 44 from the patterning memory 25 is transmitted to inputs D of the bistable trigger circuits 30 of each of the accumulators 10a to 10d (FIG. 4). At the outputs Q of each of the circuits 30 there is generated pulses 45a to 45d, shown in FIG. 7. The bistable trigger of the D type is characterized by the feature that with a change in clock pulse from level low to level high the level of voltage on the input D is transferred on the output Q. At another period the output is not affected. In FIG. 4 the invertors are provided on the inputs of the clock pulses of T circuit, so the change of the state of circuits 30 and 31 occurs if the signal is changed from "high level to low level" in lines 28a and 4a. The courses of pulses 45a ... 45d precisely correspond to that on the Q output. Thus, if in the time interval 44a the signal 44 has a value 0 or when the signal has changed from value 1 to value 0, respectively, then the course of pulses 45a is changed from value 1 to value 0. This is caused by circuit 30. This applies also for signals 42b to 42d during time intervals 44b to 44d. The resultant signals 45a to 45d are fed to the inputs D of the associated circuits 31 while simultaneously the clock pulses 43a to 43d arrive at inputs T of the same circuits 31. This causes during the time intervals 46a to 46d a change of the value of output signal 47a to 47d on lines 32a to 32d. If however, the signal 45a had a value 0, then the signal 47a is changed to 0 and vice versa. This applies also to all remaining accumulators 10b to 10d. Signals 47a to 47d are fed to the separate power amplifiers 33a to 33d, and are accordingly amplified and transmitted into the electromagnets for performing needle selection. As the speed of control unit 29 is higher than the speed of the individual knitting machines, the input circuit of each electromagnet is always in the correct condition for recording the position during the time intervals 46a to 46d.

Briefly in summary, it will be seen that each of the plurality knitting units is provided with means of its own (needle and course counters, decoders and accumulators) by which the position of each needle in any course can be determined for reading the pattern. However, only a single patterning memory and control device are necessary for synchronous, but independent operation. By means of the single control unit providing operating clock signals the individual needle and course counters may be switched sequentially to the control memory, while simultaneously the output from the central memory to the appurtenant accumulators for control of the electromagnets selecting the needles is switched by the same control unit at such speed, that the output values of the information for operation of the needle control power amplifiers are taken from the accumulators of each of the knitting machines by means of a signal from the needle counter synchronously with the passing needles.

In the foregoing manner it will be seen that the central control 29 furnishes time clock pulses, and the counting, decoding etc., occurs, separately and independently for each machine, notwithstanding the use of a common patterning memory.

The advantage of the present invention consists in that the separate knitting machines may then operate independently of each other, i.e. their speed of knitting need not be the same, and that the machines having failures might be switched off without influencing the operation of the other machines; this shortens idle time and waste of material. The control of the whole group of machines from central patterning and control devices makes possible to control the manufacture in knitting mills more economical.

In the foregoing description reference has been made to various circuits and components. Circuits SN 7400, 7403, 7493 and PROM 1 and 2 are products of the Texas Instruments Comp., Houston, Tex., Similar circuits are also manufactured by Fairchild Semiconductor Comp., 464 Ellis St., Mountain View, Calif., 94040. In the catalogue of the Fairchild Semiconductor Co. of June 1972 there is a comparison between the circuits of Texas Instrument and Fairchild. Circuit 7400 is equivalent to Fairchild Circuit 9N00, SN 7403 to 9N03 and 7493 to 9393. PROM is indicated in the catalogue by 93406 and all circuits are fully described in the said catalogues. Details of these circuits can be found in, and reference is made to the above publications which are incorporated herein, as if more fully set forth.

Various changes, modifications and embodiments have been suggested in the foregoing description, others will be obvious to those skilled in the art. It is intended therefore that the present disclosure be taken as illustrative only and not as limiting of the present invention.

What is claimed:

1. Apparatus for individually controlling a plurality of knitting machines, each of which has needle selectors, means for actuating said needle selectors and means for counting both needles and courses for determining the needle position of each of said machines comprising a common patterning memory adapted to be read by a pulse from each of said needle and course counters and to provide a signal for operating each of said needle selector actuating means, a central control device, said central control device having means for providing pulses for the successive switching of said needle and course counters in each machine to said common patterning memory and for simultaneously switching the output of the common patterning memory to the associated needle selector actuating means of each selector at a speed synchronous with a signal from the needle counter corresponding to the passage of the needles in the associated machine.

2. The apparatus according to claim 1 wherein each of said needle selector actuating means includes a power amplifier and an accumulator, said control device including means for switching output from the common patterning memory to the appurtenant accumulators at such speed, that the output values of the information for the power amplifiers are taken from the accumulators of the separate machines by imposition of a signal from the needle counter synchronously with the passing needles.

3. The apparatus according to claim 1, wherein the control device emits a pulse cycle for all of the machines in the group in a shorter time interval than the length of the time interval of the pulse provided by the needle counter of the fastest machine.

4. The apparatus according to claim 2, including a photo pickup sensing the passage of the needles and providing a pulse thereof, a decoding device interposed between said needle and course counters and said patterning memory and wherein the separate accumulators are connected to outputs from the control device and to a further output from the common patterning memory and the outputs from the pickups of needle pulses.

5. The apparatus according to claim 4, wherein each accumulator consists of two bistable trigger circuits, and having an output and two inputs, the first input of the first bistable trigger circuit being connected to the output from the common patterning memory, the second input being connected to a clock pulse output from said control device, the output of the first bistable trigger circuit being connected to the first input of the second bistable trigger circuit, the second input of which is connected to a clock pulse from the photo pickup of needle pulses, the output of said second bistable trigger circuit being connected to said power amplifier.

6. The apparatus according to claim 5, wherein the outputs from the control unit are connected to the inputs of a gate system the other inputs of which are connected to needle counters and to the inputs of a second gate system of which the other inputs are connected to course counters, the outputs of said gate systems being connected to a decoding device.

7. A method for individually controlling a plurality of knitting machines, each of which has needle selectors, means for actuating said needle selectors and needle and course counters for determining the needle position of said machine, comprising furnishing a common patterning memory adapted to be read by pulses from each of said needle and course counters and to provide a signal for operating each of said needle selector activating means and a central control device providing pulse signals for the successive switching of each of said needle and course counters to said common memory and simultaneously switching the output of the patterning memory to associated needle selector actuating means at a speed synchronous with a pulse signal from the needle counter corresponding to the passage of the needles.

8. The method according to claim 7 wherein each of said needle selector means includes a power amplifier and an accumulator and said control device switches the output from the central memory to the appurtenant accumulator at such speed, that the output values of the information for the power amplifiers are taken from the accumulators of the separate machines by imposition of a signal from the needle counters synchronously with the passing needles.

9. The method according to claim 7 including the step of causing the control unit to emit a pulse cycle for all of the machines in a shorter time interval than the length of time interval caused to provide a needle pulse in the needle counter of the fastest machine.

* * * * *